Aug. 27, 1940. C. C. RICHARD Re. 21,544

HYDRAULIC MECHANISM FOR DETERMINING THE PATH OF MOVEMENT OF A TOOL OR OTHER ELEMENT

Original Filed May 8, 1930 6 Sheets-Sheet 1

INVENTOR

Clement C. Richard

By Parker, Carlson, Pitman & Hubbard

ATTORNEYS

Aug. 27, 1940. C. C. RICHARD Re. 21,544

HYDRAULIC MECHANISM FOR DETERMINING THE PATH OF MOVEMENT OF A TOOL OR OTHER ELEMENT

Original Filed May 8, 1930 6 Sheets-Sheet 2

INVENTOR

Clement C. Richard

By Parker, Carlson, Pitzner & Hubbard

ATTORNEYS

Aug. 27, 1940. C. C. RICHARD Re. 21,544

HYDRAULIC MECHANISM FOR DETERMINING THE PATH OF MOVEMENT OF A TOOL OR OTHER ELEMENT

Original Filed May 8, 1930 6 Sheets-Sheet 3

INVENTOR

Clement C. Richard

By Parker, Carlson, Pitzner & Hubbard

ATTORNEYS

Aug. 27. 1940. C. C. RICHARD Re. 21,544

HYDRAULIC MECHANISM FOR DETERMINING THE PATH OF MOVEMENT OF A TOOL OR OTHER ELEMENT

Original Filed May 8, 1930 6 Sheets-Sheet 4

INVENTOR
Clement C. Richard
By Parker, Carlson, Pitzner & Hubbard
ATTORNEYS

Aug. 27, 1940. C. C. RICHARD Re. 21,544

HYDRAULIC MECHANISM FOR DETERMINING THE PATH OF MOVEMENT OF A TOOL OR OTHER ELEMENT

Original Filed May 8, 1930 6 Sheets-Sheet 5

INVENTOR

Clement C. Richard

By Parker, Carlson, Pitney & Hubbard

ATTORNEYS

INVENTOR
Clement C. Richard
By Parker, Carlson, Pitzner & Hubbard
ATTORNEYS

Reissued Aug. 27, 1940

Re. 21,544

UNITED STATES PATENT OFFICE 21,544

HYDRAULIC MECHANISM FOR DETERMINING THE PATH OF MOVEMENT OF A TOOL OR OTHER ELEMENT

Clement C. Richard, Bloomfield Hills, Mich., assignor of one-third to Otis K. Richard, Detroit, Mich.; Detroit Trust Company, executor of said Otis K. Richard, deceased, and one-third to H. Kain, Detroit, Mich.

Original No. 2,016,931, dated October 8, 1935, Serial No. 450,853, May 8, 1930. Application for reissue July 29, 1939, Serial No. 287,333

48 Claims. (Cl. 82—14)

This invention relates to means for determining or controlling the position or path of a tool or other element in the performance of work, its purpose being to secure an easily controlled mechanism by means of which power is applied, preferably by fluid under pressure, to the tool or other element to cause the same to vary in position during the performance of work.

The invention is more particularly useful in controlling the path of movement of a cutting tool in metal working machines, the object being to provide a comparatively simple and inexpensive structure in which, through use of a model or pattern the cutting tool is made to traverse a predetermined path in reproduction of the contour of the model on the line or points contacted by the tracer.

The device may be built as a component part of or as an attachment to various metal working machines as a lathe, planer, routing or surfacing machine and the like in which the tool or the work as may be necessary with any specific machine is mechanically moved and the tool varied in its relative path of movement to correspond to the contour of a model or pattern.

A further object and feature of the invention resides in the provision of a tracer element for contacting the surface of a model in which the pressure of the tracer tool in contacting the surface traced is negligible whereby a model having a soft or readily deformed surface may be used and in conjunction with such feature the provision of means controlled by the tracer to cause the metal working tool to correspondingly move and perform its function during the cutting operation.

Thus, by the construction permitting the light "touch" of the tracer tool on the surface of the model, the model may be continuously used for a long period inasmuch as no deformation or scoring of the surface traced, sufficient to affect the operation of the cutting tool, is produced even though a plaster model is utilized and the tool is rigidly held in traversing a varied path, sufficient power being applied thereto through the movement of the tracer tool to maintain the tool in its respective position with the work or in other words, preventing deflection from the predetermined path of movement in the cutting operation.

It is a further object of the invention to provide a means hydraulically actuated for causing the tool to traverse a predetermined path through movement of the tracer or a model or pattern.

Other objects and novel features of the invention reside in the various details of construction and arrangement of the parts in the performance of the necessary function of control of the tool by the tracer element in a hydraulically actuated device including the tracer element and means controlled through the variation in position of the tracer and a valve structure associated therewith through which power is applied hydraulically in moving the tool to correspond exactly or proportionately to the movement of the tracer.

These and other various objects and features of the invention are hereinafter more fully described and claimed and the preferred form of construction of a machine embodying my invention is shown in the accompanying drawings in which:

Fig. 1 is an elevation showing my improved mechanism as applied to control a planer tool, a portion only of the planer being shown.

Fig. 1*a* is a fragmentary front view, partially in elevation and partially in section, with a portion of the drives shown diagrammatically, of the planer illustrated in Fig. 1.

Fig. 1*b* is a sectional detail view taken along line 1*b*—1*b* of Fig. 1*a* and illustrating the right end of the feed control.

Fig. 1*c* is a fragmentary sectional view taken along line 1*c*—1*c* of Fig. 1*a*.

Figure 1:
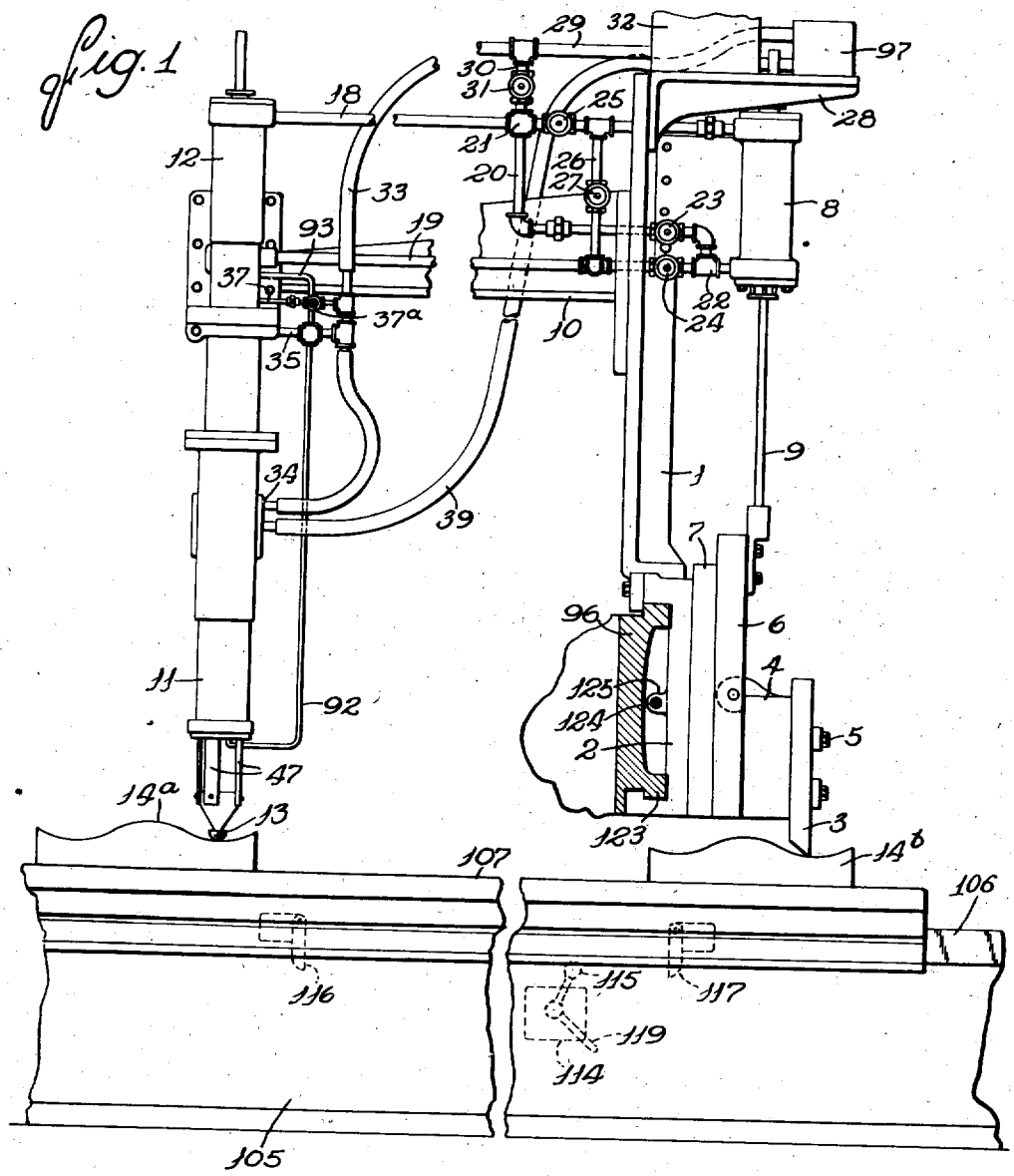
Figure 1A:
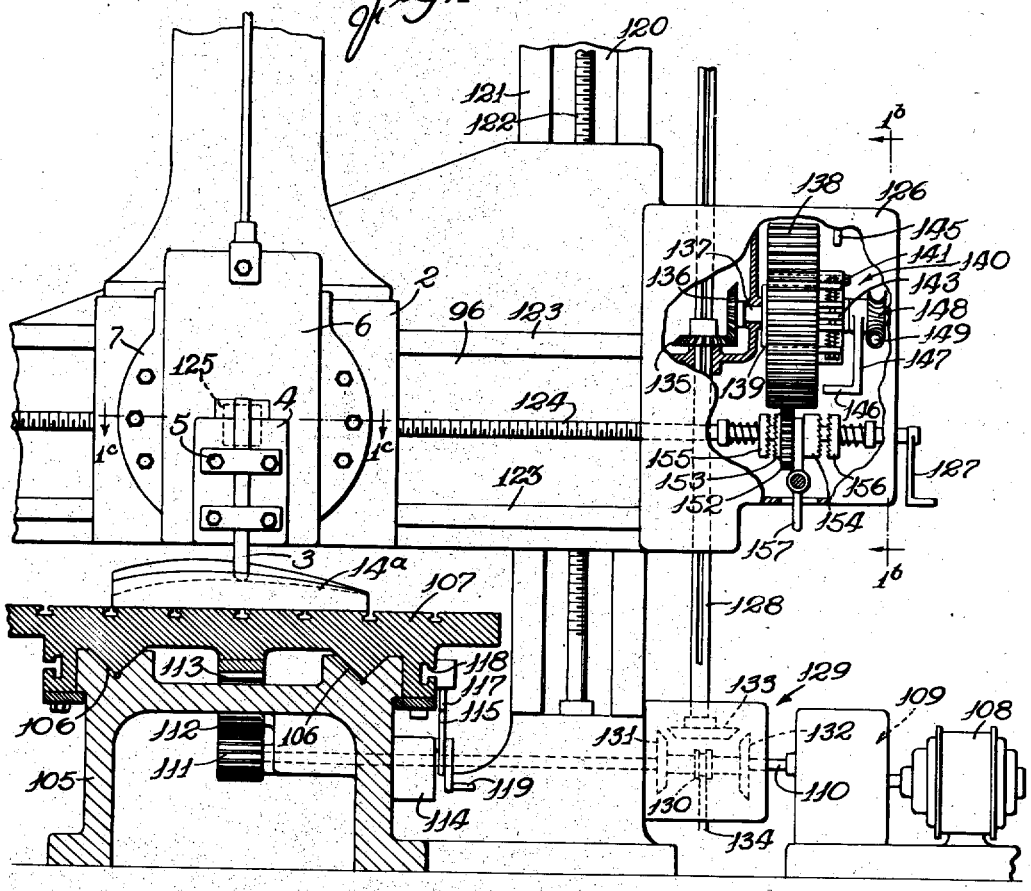
Figure 2:
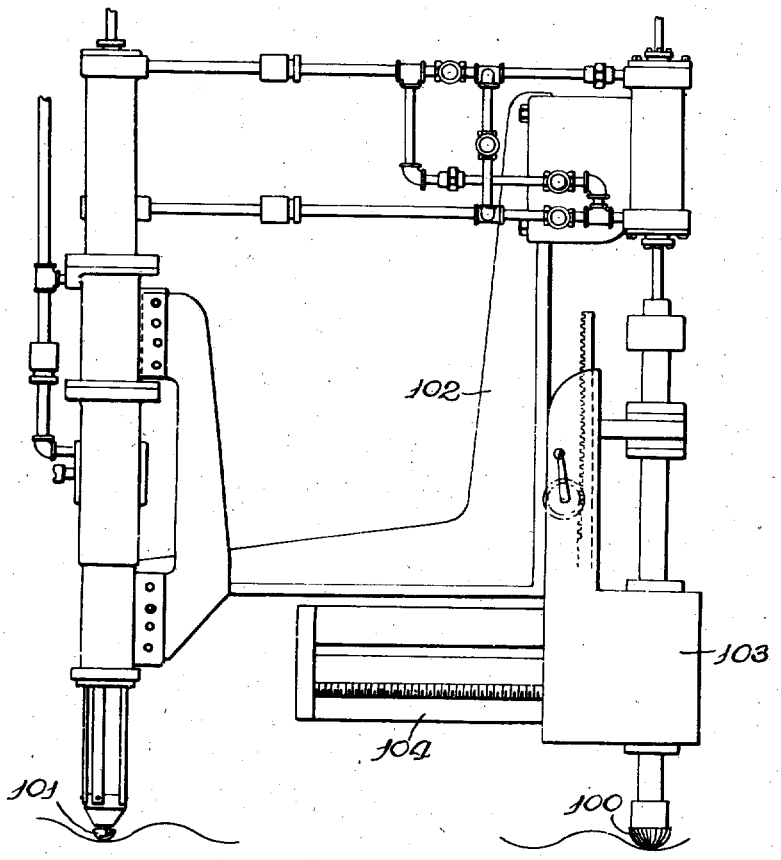
Fig. 2 is an illustration of my improved device as applied to the control of a rotating tool.
Figure 3:
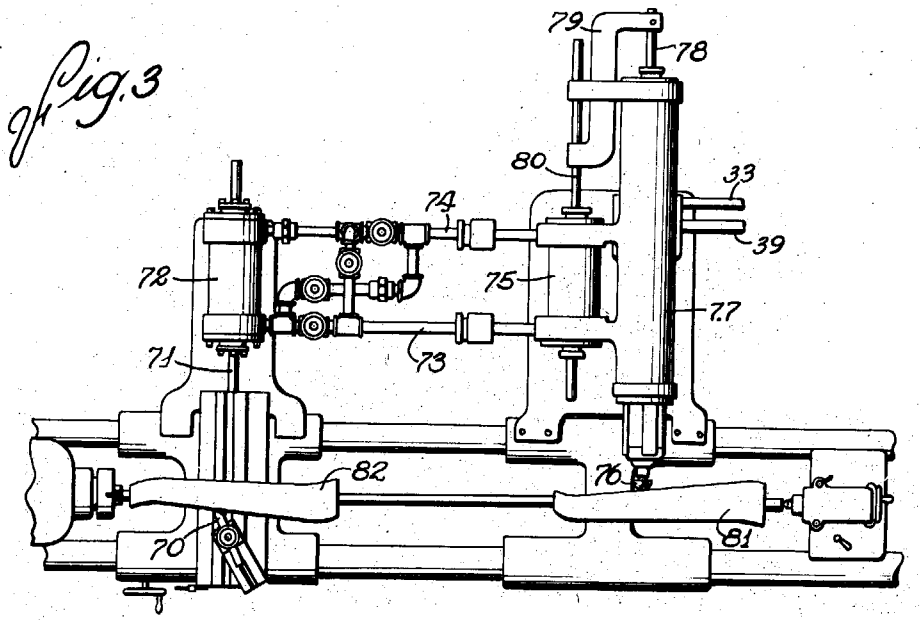
Fig. 3 is an elevation of the device as applied to the control of a lathe tool.

In all the various applications of my improved tool controlling device some of which are shown in Figs. 1, 2 and 3, the device may be made as an attachable unit to the part of the machine intended to carry the tool or may be built as a component part of the machine, the actual manner of attachment or construction of the carrying mechanism not being an essential part of my invention but, in any of the possible applications, the tool controlling mechanism is carried by the part causing the movement of the tool or that supports the tool while the work moves relative thereto.

Figure 1C:
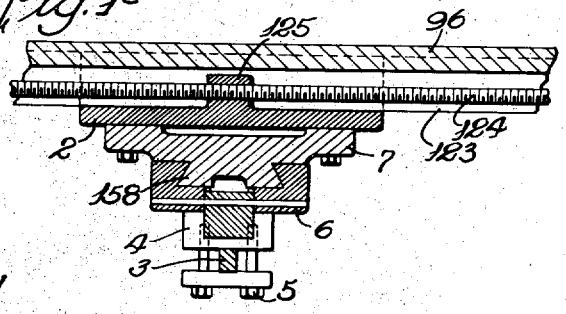

An application of my invention to a large planer is illustrated in Figs. 1 to 1c. In the form shown, the planer comprises a horizontal bed 105 provided at the top with longitudinal ways 106 on which a table 107 is mounted for reciprocation. The table 107 is adapted to be translated by a reversible power drive which in the present instance is shown as a reversible electric motor 108 connected through a speed reduction gearing 109 to a shaft 110 in turn connected through a pinion 111 and an idler gear 112 to a longitudinal gear rack 113 on the underside of the table. A reversing mechanism 114 on the side of the bed 105, which may be of any suitable type adapted to reverse the table drive, such, for example, as a reversing switch in the circuits for the motor 108, has an oscillatory control arm 115 projecting upwardly into the path of two spaced dogs 116 and 117 on the table 107. These dogs are mounted on one side of the table 107 for selective adjustment along a longitudinal T-slot 118, and are adapted alternately to engage and reverse the arm 115 so as to cause automatic reciprocation of the table through a predetermined adjustable range. A hand lever 119 on the mechanism 114 affords means for effecting manual reversal of the table drive.

A cross rail or arm 96 extends transversely over the table 107, and is mounted at one end on a vertical column 120 rising from one side of the bed 105. The cross rail 96 is mounted on ways 121 for vertical adjustment by means shown in part as comprising a vertical feed screw 122. The front of the cross rail 96 is provided with longitudinal ways 123 on which a slide or cradle 2 is suitably mounted for feed or indexing adjustment across the table 107.

Any suitable means may be provided for indexing the slide 2 step-by-step in timed relation to the successive reversals of the table 107 in either selected direction. In the present instance, this means is shown as comprising a rotary feed screw 124 extending longitudinally between the ways 123, and being in threaded engagement with a lug 125 on the rear face of the slide 2. The screw 124 is anchored against endwise movement and extends through a control housing 126 rigid with the right end of the cross rail 96. A hand lever 127 fixed on the end of the screw 124 affords means for adjusting the slide 2 manually along the ways 123.

The housing 126 encloses an automatic index or feed mechanism having a vertical actuating shaft 128 connected at the lower end through a reversing clutch 129 to the drive shaft 110 for the table 107. This clutch comprises a shifter element 130 slidably keyed for axial movement on the shaft 110, and provided on opposite ends with two bevel gears 131 and 132 adapted for selective movement into meshing engagement with opposite sides respectively of a bevel gear 133 fixed on the lower end of the shaft 128. A manual control lever 134 is connected to the shifter element 130, and is adapted for actuation to shift the element into either end position or into intermediate neutral position.

Slidably splined to the vertical shaft 128 within the housing 126 is a bevel gear 135 which meshes with a bevel gear 136 on a transverse shaft 137. A gear 138 is rotatable on a cylindrical drum 139 rigid and coaxial with the shaft 137, and is adapted to be clutched thereto by a split friction clutch band 140. This band is loosely anchored to the gear 138 by a pin 141, and is normally contracted by springs 142 into peripheral gripping engagement with the drum 139. A radial trigger arm 143 extends outwardly between the split ends of the band 140 for oscillatory movement through an adjustable arc 144 between a fixed stop 145 integral with the housing 126 and a stop 146 selectively adjustable to vary the amplitude of the arc. In the present instance, the stop 146 is formed on the free end of a radial arm 147 rigid with a worm wheel 148 coaxial with the shaft 137. Meshing with the wheel 148 is a worm 149 which is fixed on the inner end of a shaft 150 extending from the housing 126 and provided with a hand wheel 151 on its outer end.

Figure 1B:
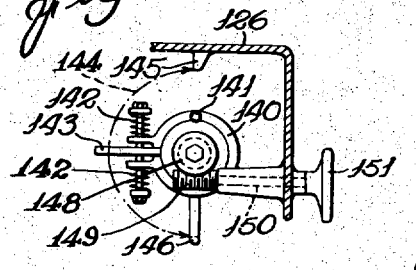

Upon rotation of the drum 139 in a clockwise direction as viewed in Fig. 1b, the band 140 will cause rotation of the gear 138 until the trigger arm 143 engages the stop 145. Thereupon, the arm 143 will expand the band 140 to permit rotation of the shaft 137 independently of the gear 138. Upon reversing rotation of the drum 139, the band 140 will again contract, and cause rotation of the gear 138 in the opposite direction until the arm 143 engages the adjustable stop 146 to again disengage the gear from the shaft 137. In effect, the periodically reversing shaft 128 serves to oscillate the gear 138 through a predetermined amplitude as determined by the adjustable spacing of the stops 145 and 146.

The gear 138 meshes with a gear 152 which is freely rotatable and axially shiftable on the shaft extension of the screw 124, and which is formed on opposite ends with crown ratchet elements 153 and 154 having teeth respectively of opposite inclination. Splined to the shaft extension at opposite sides of the gear 152 are two ratchet elements 155 and 156 complemental to and adapted for yieldable engagement respectively with the elements 153 and 154. A manual control lever 157 is provided for shifting the gear 152 to move one or the other of the elements 153 and 154 respectively into engagement with the mating elements 155 and 156 to effect incremental rotation of the screw 124 in the desired direction, or to position the gear in intermediate neutral position so that the screw may be actuated manually by means of the hand lever 127.

It will be seen that through the hand controls 134 and 157, the slide 2 may be shifted step-by-step in either selected direction upon reversals of movement of the table 107 at either selected end of its reciprocation, and that the extent of each index movement may be adjusted minutely over a wide range from mininum to maximum by means of the hand wheel 151.

My improved tool controlling device comprises a supporting arm 1 which is rigidly mounted on the slide 2. A swivel guide block 7 is suitably secured to the face of the cross slide 2, and is formed with vertical ways 158 on which a tool head or base 6 is suitably mounted for sliding movement in a general direction toward and from the plane of the top surface of the table 107. The tool 3 is secured as by means of clamp bolts 5 to a clatter box 4 pivoted on the base 6. Supported by the arm 1 also is a cylinder 8 within which there is a piston, as hereinafter described, to which is connected a rod 9 attached to the slidable base 6 and by which the tool in the construction shown in Fig. 1 may be raised or lowered in a vertical plane. On the arm 1 of the machine with which the control device is associated is another fixed arm 10 extending to the rear of the arm 1 of the planer and supporting the tracer or feeler assembly indicated generally at 11.

In axial alignment therewith and attached thereto at the upper end is a cylinder 12 corresponding to that of the cylinder 8 containing the piston connected with the tool. In this arrangement of the parts the tracer tool or point 13 which may be shaped as desired dependent upon the requirements of the work and is here shown as being provided with a smooth rounded end which contacts the surface of a model or pattern indicated at 14a and the position of the tracer tool in a vertical plane causes the cutting edge of the tool 3 to vary in like manner and to the same degree in the relative cutting traverse along the work 14b as shown. The cylinder 12 is shown in section in Fig. 5 within which is a piston 14 secured to a rod formed of two parts 15 and 15a that is movable longitudinally in the cylinder through the packing glands 16 and 17 at the respective opposite ends thereof. The cylinder 8 and piston therein heretofore mentioned is practically of the same construction and arrangement. A pipe 18 connects the upper ends of the cylinders 8 and 12 and a pipe 19 likewise connects the lower ends of the cylinders 8 and 12 and it will be seen that, by movement of the piston 14 in the cylinder 12 the piston in the cylinder 8 will be displaced in the opposite direction to a similar extent and thus the tool under such an arrangement will be made to cut a form the reverse of the model which in some classes of work is the desired manner in which to control the tool. The cylinders 8 and 12 and the pistons therein provide elements associated respectively with the cutting tool and the tracer.

In order that the tool may move in the same direction as the tracer rather than the reverse thereof, as above stated, a crossover arrangement is provided which consists of a conduit 20 open to the conduit 18 at the fitting 21 to which it is connected and to which the conduit 18 is open and the opposite end of the conduit 20 is connected in the line 19 at the point 22 there being a valve 23 in the said conduit 20. There is also a valve 24 in the conduit 19 and a valve 25 in the conduit 18. Also there is a conduit 26 which is connected with the conduit 19 on the tracer side of the valve 24 and with the conduit 18 on the tool side of the valve 25: This conduit 26 also has a valve 27 therein. By closing the valves 24 and 25 and opening the valves 23 and 27, fluid from the top of the pump cylinder 12 is transferred to the bottom of the tool cylinder 8 and fluid from the bottom of the cylinder 12 is simultaneously transferred to the top of the cylinder 8. Under this condition, downward movement of the piston in the cylinder 12 by the downward movement of the tracer tool, as hereinafter more fully described, causes the piston in the cylinder 8 to move downwardly to the same or proportionate extent thus moving the tool in the same direction the tracer element 13 moves.

It is to be here noted that the planer construction, which is represented in Fig. 1, is of a type in which the beam carrying the cutting tool is stationary while the table 107 on the bed 105 is caused to move relative to the tool. In such arrangement the model 14a and the work 14b are attached to the table 107 and thus are simultaneously moved respectively to the tracer and to the tool and it is further to be observed that it is not necessary to align the tracer and the cutting tool in the same vertical plane as the tracer and model may be positioned at any convenient point at one side of the machine either at the side of or forwardly or rearwardly of the tool and this is due to the hydraulic control feature it being possible to arrange the conduits between the cylinder 12 and cylinder 8 to position the tracer as may be desired. The entire tracer element 11 may for some purposes be mounted on a holding element, such as the slide 2, and movable longitudinally of the cross rail 96 simultaneously with the tool holder.

As has been previously stated, a feature of my invention resides in the construction of a tool controlling device of such character that the tracer may be moved with the utmost ease while the tool is positively moved while it is forming the cut and thus is subjected to considerable pressure. In apparatus of this kind it is necessary that the work shall exactly conform in its finished surface to that of the model and thus the tool must move to the exact extent or degree that the tracer is moved either in the same direction or in an opposite direction depending upon whether the work is to be a duplicate of the model in its formed surface or the reverse of the surface of the model.

In such cases where it is desired or necessary that the tool move proportionately to the extent of movement of the tracer, that is, either to a greater or to a less extent, the tool cylinder 8 may be of greater or less diameter than the diameter of the cylinder 12 or otherwise arranged whereby the displacement of fluid in the cylinder 12 by movement of the tracer causes a lesser or a greater displacement in the cylinder 8 and consequent variation in movement of the piston in the cylinder 8 connected with the rod 9.

Figures 4, 5:
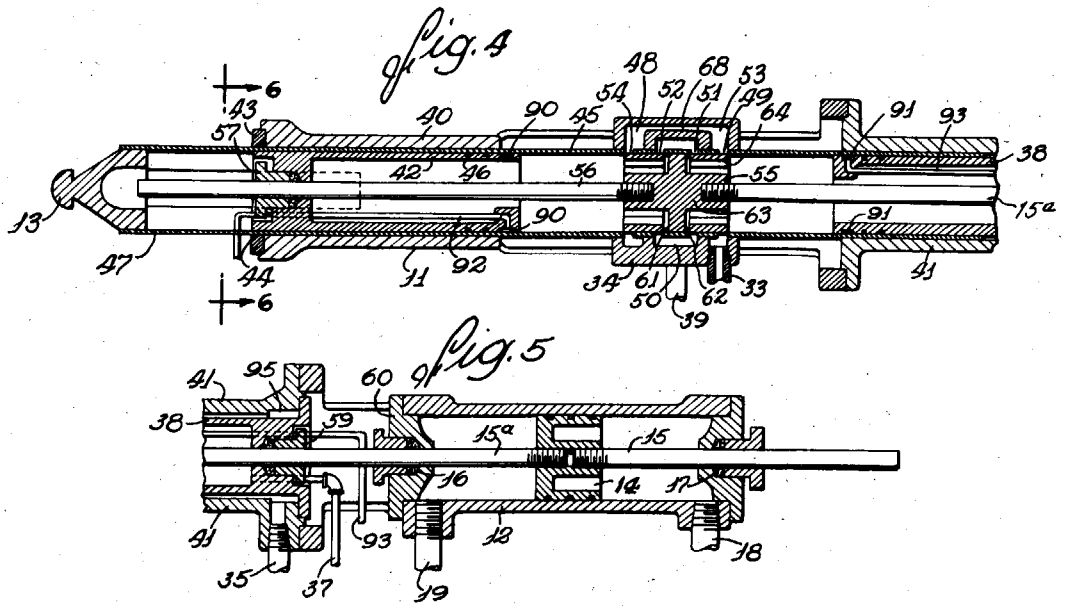
Fig. 4 is an enlarged sectional detail of a part of the tracer element.
Fig. 5 is a similar section of the remaining portion thereof.

To secure a tracer that may be moved with the utmost ease, or in other words, that contacts the model with an extremely light "touch," I have devised a construction shown more clearly in Fig. 4.

It is further to be understood that a pump of any approved form indicated diagrammatically at 97 may be secured to a bracket 28 or in other approved position by means of which any desired pressure may be maintained in the conduit 39 which is connected with the chambered casing 34. The pipe 29 opening to the gravity tank 32 is connected by means of a pipe 30 with the fitting 21 permitting the fluid in the tank 32 to flow by gravity into the power transmission system composed of the conduits 18, 19, 20 and 26 and cylinders 8 and 12 thus filling the same for purposes hereinafter stated. The pipe 30 has a shut-off valve 31 therein for the purpose of separating the power transmission system from the gravity tank and low pressure line 29. The power transmission system may also be filled by a suitable connection with the high pressure line 39 (not here shown) but as will be readily understood by those persons familiar with this art.

The conduit 29 has a flexible extension 33, the terminal end of which is connected with the chambered casing 34 and intermediate its ends is connected by means of a conduit 35 with a recess in the upper end of the cylinder 41, as shown in Fig. 5, for a purpose hereinafter described. Also connected with this line 33 is a valve controlled conduit 37 extending through the head of the stationary cylinder 38 for a purpose hereinafter stated.

The line 33 provides a conduit for the return of fluid from the low pressure chambers in the casing 34 to the gravity tank and may or may not be under pressure depending upon the position of the gravity tank 32. The pump 37, taking its supply of fluid from the gravity tank, maintains a high pressure in the discharge line 39 and consequently in the high pressure chambers of the casing 34. The tracer element, indicated generally at 11, consists of a casting the axis of which is in a vertical plane when the apparatus is utilized in connection with a planer as shown in Fig. 1 but it will be understood that, depending upon the character of the machine tool to which this control apparatus is associated, the tool may be differently arranged than here shown. This element 11 consists of a casting 40 attached at its upper end to a cylindrical element 41 as will be seen in Fig. 4.

Figure 6:
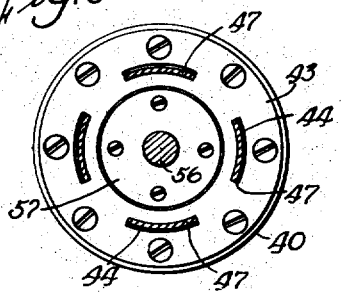
Fig. 6 is a section taken on line 6—6 of Fig. 4.

At its lower end the element 40 is cylindrical in form within which is secured a stationary head 42 spaced from the wall of the element 40 at the lower end and supported in place by the flange 43 attached to the lower end of the element 40. This flange 43 has arcuate slots 44 formed therein as shown in Fig. 6 and a metal tube 45 is reciprocable in the space between the stationary element 42 and the lower end of the element 40 the piston being provided with packing rings 46 to prevent leakage between the tube 45 and the piston.

At its lower end the sleeve is slotted from the lower end inwardly forming four arcuate portions 47 which extend through the slots 44 of the flange 43. In assembling this element 42 and sleeve, the sleeve is first introduced into the element 40, the head 42 then being inserted in the sleeve with the portions 47 thereof extending through the slots 44 of the flange 43. Thereafter the tracer point 13 has the base thereof secured in the end of the portions 47 of the sleeve in any approved manner as by bolting the same to portions 47 of the tube.

The tube 45, as shown in Fig. 4, is reciprocable in the space between the portion 40 and the stationary head 42 at the lower end and between the element 41 and the stationary head 38 at the upper end. To prevent high pressure liquid from accumulating between the heads 38 and 42 and the tube and thus frictionally resist movement of the tube, these two stationary heads are preferably constructed at their respective inner ends with a circumferential groove 90 and 91 and these grooves respectively open at one point to an outlet conduit 92 and 93 extending outwardly through the respective heads connected with the low pressure line 35 of the system as indicated in Fig. 1.

Figure 7:
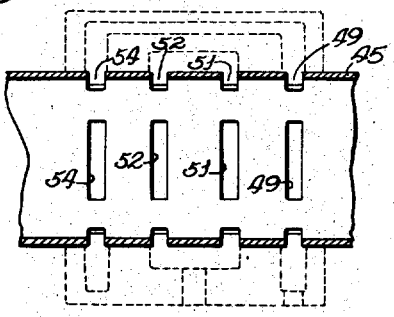
Fig. 7 is a section through a portion of the tracer tube showing the valve ports or openings.
Figure 10:
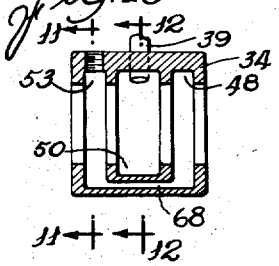
Fig. 10 is a section of the chambered casing attached to the tube about the said ports.
Figure 11:
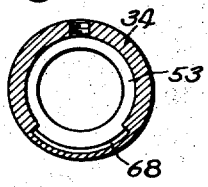
Fig. 11 is a section taken on line 11—11 of Fig. 10.
Figure 12:
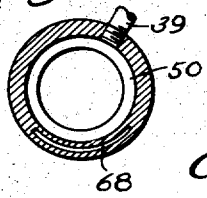
Fig. 12 is a section taken on line 12—12 of Fig. 10.

The chambered casing 34 is also brazed or otherwise fixed to the tube at the point the ports are formed as will be understood from Fig. 4 and Fig. 7 in which latter figure the casing is shown by a dotted line. This chambered casing, as will be seen in Fig. 10, has a central bore in which the tube 45 fits and thus forming annular chambers of channel-like form about the tube. The chamber 48 is positioned on the tube to enclose the ports 54 of the tube of which there are one or more in the same plane in the form of slots. The chamber 50 of the casing is of greater width and is positioned on the tube to enclose the ports 51 on the one side and 52 on the other side, while the chamber 53 encloses the ports 49 of the tube.

Figure 9:
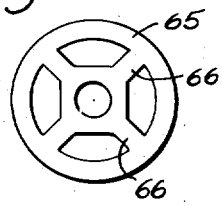
Fig. 9 is an end view thereof.

This chambered casing and ported tube cooperate with a piston 55 that is slidable longitudinally of the interior of the tube and is supported in position therein by the rod 56 secured at its upper end to the piston as by being threaded thereto and extends through the lower end of the head 42 and packing gland 57 thereon while the rod 15a is similarly attached to the upper end of the piston and extends upward through an aperture in the wall of the stationary member 38 which is provided with a packing gland 59 to prevent leakage and extends upwardly into the pump chamber 12 through an aperture in the head 60 thereof also provided with a similar packing gland and interiorly of the cylinder 12 is secured to the piston 36 to which is also secured the rod 15 extending through the upper end of the piston and packing gland 17 therefor. The piston 55 is ported near its center by the cylindrical ports or slots 61 and 62 which are cut inwardly toward the central core 63 of the piston leaving the end portions 64 and 65 thereon supported in spaced relation with the core by the webs 66 there being several of the same as shown in Fig. 9, and these spaces between the webs 66 are open to the slots 61 and 62. The portions 64 and 65 are also of the same diameter as the central cylindrical portion 67 of the piston and slidably fit the interior of the tube. When the piston is in neutral position, flow of fluid under pressure must be prevented for which purpose either the high pressure or the low pressure ports must be closed. In the preferred construction shown in Fig. 4, both the low pressure ports 49 and 54 and the high pressure ports 51 and 52 are closed.

In operation of the device the tracer tool, in tranversing the surface of the model and due to the configuration thereof, is either raised or lowered relative to the position shown in Fig. 4. If it be lowered, the ports 54 are opened to the lower side of the piston and the ports 51 are open to the port 62 of the piston and thence through the space between the webs 66 supporting the parts 64 to the upper side of the piston while the ports 49 and 52 remain closed. The port 62 in such case receives the high pressure liquid from the conduit 39 which is transferred to the upper side of the piston 55 causing the same to descend a distance equal to the extent of movement of the port which is the distance the tracer element moves. This causes the liquid from the under side of the piston, during the time the ports are open, to pass into the chamber 48 and thence to the chamber 53 by means of the passageway 68 therebetween to the low pressure conduit 33. The reverse condition exists on upward movement of the sleeve 45 in which case the high pressure fluid is introduced beneath the piston and the fluid above the piston is discharged to the lower pressure line 33. This arrangement of the piston, chambered casing 34, and ported sleeve connected with the tracer element provides a very accurate mechanical structure causing the piston 55 to instantly move with the movement of the tracer element as the ports need only be opened to the slightest degree to secure the necessary action.

As previously stated, the rod 15a, which is connected with the upper end of the piston 55, as shown in Fig. 5, is also connected with the piston 14 in the pump cylinder 12 which in turn is connected by the lines 18 and 19 with the tool controlling cylinder 8 in which latter cylinder the piston therein is connected with the rod 9. As both cylinders 12 and 8 are maintained filled with liquid and the valve 31 in the supply line 30 closed, any movement of the piston 14 in its cylinder results in an exactly similar movement of the piston in the cylinder 8 which is transferred to the tool. Thus the movement of the tracer is reproduced in the movement of the tool to an exactly like or proportionate degree in the arrangement shown and either the tool may move in a direction opposite that of the tracer or in the same direction as heretofore stated. This result is attained irrespective of whether the work and pattern are moved relative to the tool and tracer or the tool and tracer are moved respectively to the work and the pattern.

It is to be noted that the tracer and the tool in the construction shown in Fig. 1 move in a line contacting with the pattern and the work and in such case either the tool and the tracer are moved transversely of the surface of the work each time a cut is made or the work and pattern are moved transversely of the direction of movement of the cutter and tracer so that the entire surface of the work will be finished to correspond to the surface of the pattern, that is, an identical reproduction or a reverse of the pattern.

Figure 8:
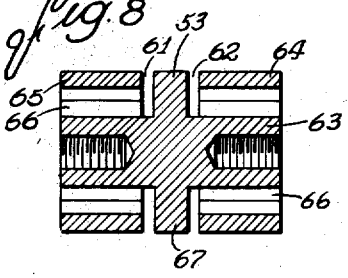
Fig. 8 is a section through the control piston.

In the construction shown in Fig. 3, I have shown a lathe the cutting tool 70 of which is carried in a block connected with the rod 71 of the cylinder 72 which has a piston therein connected with the rod 71 as in the case of the planer shown in Fig. 1 and this pump cylinder, by means of the conduits 73 and 74, is connected with the upper ends of the pump cylinder 75 controlled by the tracer 76. The traces 76 and cylinder 77 therefor are identical with that shown in detail in Fig. 4 except that the pump cylinder 75 is not in axial alignment with the tracer cylinder. On the contrary, the ported piston within the chamber 77, which is constructed like the piston 55 shown in section in Figs. 4 and 8, has the stem 78 corresponding to that at 15ª in Fig. 5 connected with a bracket 79 which is attached to a projecting rod 80 of the piston within the cylinder 75. Thus, movement of the tracer and consequent control of the position of the piston therein is communicated to the piston in the cylinder 75 and through the lines 73 and 74 and crossover lines connected therewith to the piston in the cylinder 72, these parts operating practically identically with that of the conduits and crossovers between the cylinders 8 and 12 of Fig. 1. In the arrangement shown in Fig. 3, the tool is arranged to move in a direction reversely of the direction of movement of the tracer 76 as will be understood from the position of the tracer relative to the pattern 81 and of the tool relative to the work 82 which is revolved in any approved manner as will be readily understood. In the case shown the work and the pattern are supported by the usual head and tail stocks.

In the form of the parts shown in Fig. 2, a rotating tool 100 is utilized for routing or surfacing operation which is movable by means of the tracer 101 having the cylinder and arrangement of parts as shown in Figs. 4 and 5 by means of which the tool is caused to move. In this particular view the control mechanism is mounted upon an arm 102. In the structure of Fig. 2, which may be used in horizontally boring mills or vertical milling machines, the tool 100 is supported by a casting 103 which houses the customary rotating mechanism supported on a rail 104 in either horizontal, vertical or angular position and Figs. 2 and 3 are here shown principally to illustrate and make clear the fact that my improved tool control mechanism is adapted for use with various types of metal working tools and other adaptations will be readily apparent to those familiar with the various types of machine tools in use, the specific construction of which forms no principal part of the invention herein disclosed.

In any of these cases of use, the chamber 95 at the upper end of the casting 41, shown in Fig. 5, is open by means of a conduit 35 with the low pressure line 33 of the system. This chamber 95 is at the head of the tube or sleeve 45 and thus a light pressure may be maintained on the end of the tube which tends to hold the tracer in contact with the pattern in any position occupied by the tracer unit, that is, either horizontal, vertical or at an angle relative thereto.

This represents only one means by which the tracer may be held in contact with the pattern but other means may be employed such for instance as a counterbalance for the tracer and tube whereby the pressure with which the tracer contacts the pattern may be reduced to a minimum without departing from the spirit of the invention. With any such arrangement a light contact of the tracer with the pattern is secured and due to such an arrangement of the parts, the position of the tracer and the tube may be varied freely without varying the degree of pressure to which the tracer is submitted and yet, by the mechanism described, the power by means of which the tool is moved is sufficiently great to rigidly hold the tool at any point of its movement through operation of the tracer.

Also, as shown in Figs. 1 and 5, there is a conduit 37 controlled by a valve 37ª connected with the low pressure conduit for the purpose of preventing any accumulation of air in the top of the cylinder head 38.

From the foregoing description it is believed evident that the various features and objects of the invention are attained by the construction and relationship of the parts described, that is, that a control device is secured by means of which a tool is made to traverse a path corresponding to the path of movement of a tracer element contacting a model or pattern, and that the surface of the work is made to conform exactly or proportionately to that of the model, and that the tool in the performance of the cutting operation is actuated by the machine with which this control device is associated—that is, the machine moves the tool to perform the cut or moves the work relative to the tool for the same purpose.

Further this invention seeks to provide a hydraulic mechanism for causing movement of an element such as a tool or other device to be moved correspondingly to the movement of a tracer in a line at an angle ot the surface of a pattern and is particularly useful in machine tools as in the planer or lathe construction described in which the tool is caused to move at an angle to the surface of the work. In any instance of use of my improved apparatus for controlling a tool the machine and the tool are operated to cause movement of the tool or the work as the case may be in the usual manner while my apparatus is adapted to cause variation in the position of the tool relative to the surface being formed.

It is further evident that my improved tool controlling mechanism is comparatively simple in construction and efficient in operation and adaptable for use with various metal cutting machines in which it may be provided as an attachment or as a component part thereof.

I claim as my invention:

1. In a metal forming machine, a tool and a support therefor actuated by the machine in causing the tool to perform a cutting operation, means by which the tool is caused to traverse a predetermined path to form the work corresponding to the form of a pattern comprising a tool actuating element, a fluid pressure actuated control means therefor comprising a tracer arranged to traverse the pattern in positively fixed relation with the tool as the tool is caused to traverse the work, a support for the tracer in mechanically fixed relation with the support for the tool, and means whereby movement of the tracer either toward or from the pattern and in a direction at an angle to its direction of movement in traversing the pattern applies fluid pressure to the tool actuating element to move the tool relative to its support in a direction either toward or from the work to a like extent.

2. In a metal forming machine including a tool actuated by the machine in performing a cutting operation, means by which the tool is caused to traverse a predetermined path to form the work corresponding to the form of a pattern comprising a tool actuating element supported by the machine, a control means therefor, a tracer supported in mechanically fixed relation with the tool and arranged to traverse the pattern as the tool actuating element is moved to cause the tool to traverse the work, a hydraulically actuated mechanism for operating the tool actuating element, and means whereby movement of the tracer in a direction either toward or from the pattern and at an angle to its direction of movement in traversing the pattern actuates the hydraulic mechanism to positively move the tool in a direction either toward or from the work to a like extent.

3. In a metal forming machine including a tool and a work support, means for causing a relative movement of the tool and the work in the cutting operation, a holding means for the tool, means for causing movement of the holding means to cause the tool to traverse a predetermined path in the cutting operation comprising a model or pattern, a tracer element for traversing the pattern supported in fixed relation with the tool as the tool traverses the work, means adapted to rigidly hold the tool under hydraulic pressure in any of its possible positions actuated through movement of the tracer element in a direction either toward or from the pattern and other than its relative direction of movement in traversing the pattern to cause the said tool holding means to correspondingly move the tool in a direction either toward or from the work.

4. In a metal forming machine including a tool support and a work support and mechanical means for causing a relative movement of the tool and the work, means for causing a movement of the tool relative to the work in a direction other than the direction of relative movement of the tool in the cutting operation comprising a tool engaging element, a hydraulically actuated element associated therewith, a model or pattern having a form corresponding to that which it is desired to reproduce in the work, a tracer element for traversing the pattern in positively fixed relation with the tool as the tool traverses the work, means associated with the tracer element for applying hydraulic pressure to said hydraulically actuated element, and means for controlling application of the pressure whereby the extent of movement of the tool in a direction either toward or from the work by the hydraulic controlled means corresponds to that of the tracer element in a direction either toward or from the pattern.

5. In a metal forming machine including a metal forming tool and work supporting means, mechanical means for causing a relative movement of the tool and the work in the cutting operation, a fluid pressure control means by which the tool is varied in position in a direction at an angle to the direction of movement of the work or tool by the machine, means for predetermining the distance through which the tool is moved by the control means consisting of a pattern and a tracer element for traversing the pattern as the tool traverses the work, means for applying hydraulic power to the tool control means to cause movement of the tool, and means associated with the tracer for controlling the said application of hydraulic power to the tool control means so arranged that the extent of movement of the tool in a direction either toward or from the work and other than the direction of relative movement of the work and the tool corresponds to the movement of the tracer in a direction either toward or from the pattern and other than the direction of relative movement of the tracer and pattern.

6. In a metal forming machine including a tool and work support arranged to cause a traverse of the work by the tool, hydraulically controlled mechanism for moving the tool in a direction other than the direction of movement of the tool in traversing the work, comprising a cylinder and a piston therein, a rod rigidly connected with the piston and the tool whereby the position of the piston in the cylinder determines the position of the tool, a pattern, a tracer element arranged to traverse the pattern as the tool traverses the work, means movable to cause a flow of fluid simultaneously to one side of the said piston and from the other side to cause movement thereof, a power means for moving said movable means, and means whereby movement of the tracer element in a direction other than the direction of movement thereof in traversing the pattern applies the power to cause movement of the piston and consequently of the tool to the exact or proportional extent corresponding to the extent the tracer element is caused to move in traversing the pattern.

7. In apparatus of the character described the combination with a metal cutting tool and a pattern the form of which is to be reproduced in the work being shaped by the tool and mechanism for causing relative movement of the tool and work in the cutting operation, of mechanism for causing the tool to take a varied path in the cutting movement comprising a mounting in which the tool is movable toward or from the work in a direction other than the direction of movement of the tool in the cutting operation, a tracer element for contacting the pattern, a fluid pressure controlled mechanism by which the tool is rigidly supported at any point in its mounting, means actuated by the tracer element to cause application of pressure to the fluid pressure controlled mechanism to move the tool in a direction either toward or from the work including a valve structure permitting application of pressure and consequent movement of the tool either toward or from the work to a distance exactly corresponding to the movement of the tracer element in a direction either toward or from the pattern caused by its traverse of the pattern.

8. In mechanism for controlling the path of movement of a metal cutting tool in a metal working machine having a means for causing a relative movement of the tool and the work, means for predetermining the path of movement of the tool comprising a pattern or model, a tracer element movable over the pattern as the tool traverses the work, a hydraulically controlled apparatus for rigidly supporting the tool at any point relative to the surface of the work being formed, means for producing a flow of fluid under pressure, and means operable through movement of the tracer element in a direction either toward or from the pattern to apply the fluid under pressure in a manner to actuate the hydraulic means of the tool to move the tool in a direction either toward or from the work to a like extent.

9. In apparatus of the character described, a cutting tool and a tracer, a support for work and for a pattern to be traversed respectively by the tool and the tracer, mechanism for causing the tool and tracer to respectively traverse the work and pattern in a positively fixed relationship, and mechanism for moving the tool in a direction transversely of the direction of movement of the tool and tracer in traversing the work and pattern, comprising a cylinder, a piston therein connected with the tool, means for supplying fluid to the cylinder to cause movement of the piston in either direction to correspondingly move the tool, a fluid pressure actuated means for operating said fluid supplying means to cause flow of fluid to and from the said cylinder, means controlled through movement of the tracer in a plane transversely of its direction of movement in traversing the pattern to apply fluid under pressure to the pressure actuated means in a manner to cause movement of the tool in the same direction and to the same distance the tracer is moved, and means for causing a flow of fluid to the cylinder and piston to cause movement of the tool to the same extent in a direction opposite the direction of movement of the tracer.

10. In apparatus of the character described in which a metal cutting tool is caused to shape a piece of work to correspond to the form of a pattern and in which the pattern and the work are supported in fixed relationship, a cutting tool, a mounting therefor in which the tool is movable in a direction transversely of the direction of movement of the tool in the cutting operation, mechanism for causing movement of the tool in one direction in the cutting operation, a tracer element including a point traversing the pattern as the tool traverses the work whereby the tracer element is caused to move in a direction transversely of the direction of movement of the pattern or tracer element in traversing the same, means for causing the tool to move in its mounting to exactly the same degree as the tracer moves transversely of the pattern, comprising a hydraulically controlled piston engaging the tool, a cylinder for the piston, means by movement of which fluid is caused to flow to one side of the piston and from the other whereby the piston may be moved in either of two directions to cause movement of the tool, a piston for actuating the said means for causing transfer of fluid to the said cylinder, a cylinder for said last named piston, means connected with the tracer element for admitting fluid under pressure to either side of said last named piston to cause movement thereof and consequent movement of the tool, said means limiting the period of application of said pressure to move the piston only through the distance exactly equal to the distance the tracer is moved in either direction in a plane transversely of the direction of the movement of the tracer in traversing the pattern.

11. In apparatus for controlling the path of movement of a metal forming tool relative to the work during the cutting movement, a supporting means for the work, a pattern supported in fixed relation thereto, a tracer element caused to traverse the pattern as the tool traverses the work, a hydraulically controlled element fixedly connected with the tool, means for actuating said hydraulically controlled element, comprising a tube to which the tracer element is attached, a piston in the tube, a chambered member about the tube and ports providing communication between the chambers thereof and the interior of the tube, a cylinder in which the tube is slidable, means for supplying fluid under pressure to the chambered member and a discharge line therefor, movement of the tube relative to the piston opening the high pressure chamber to the tube on one side or the other thereof and also opening the tube on the respective opposite side of the piston to the discharge line, the arrangement being such that movement of the tube in either direction through movement of the tracer in a plane at an angle to its direction of movement in traversing the work causes movement of the piston in the same direction until the high pressure port is closed, and means connected with the piston for causing a transfer of fluid to and from the hydraulic tool controlling means to produce movement of the tool to the same extent in a plane at an angle to the direction of movement of the tool in traversing the work.

12. In apparatus of the character described in which the metal working tool is caused to move in a plane at an angle to its direction of movement in traversing the work, the combination with the tool, of a cylinder, a piston therein rigidly connected with the tool, a second cylinder and piston therein, conduits extending between the two opposite ends of the cylinders whereby the position of the second piston longitudinally of its cylinder determines the position of the first piston longitudinally of its cylinder, a tracer element arranged to traverse a pattern as the tool traverses the work, a tube to which the tracer is connected, a cylindrical supporting element in which the tube is slidable, a piston in the tube rigidly attached to the second named piston, a conduit for high pressure fluid and a conduit for low pressure fluid, means whereby movement of the tracer element in a plane at an angle to the direction of movement of the tracer in traversing the work causes discharge of fluid from the high pressure conduit to one side or the other of the piston in the tube and the discharge of fluid from the respective opposite side of the piston to the low pressure conduit whereby the last named piston is caused to move through a distance equal to the distance of movement of the tube and tracer element.

13. In apparatus of the character described wherein a tool is made to vary in position relative to the surface being operated on through contact of a tracer element with a pattern, a hydraulically operated means through which the tool is rigidly held and moved to correspond to movement of the tracer, means providing fluid under pressure and a valve mechanism for controlling the pressure flow including a supporting element, a tube to the end of which the tracer element is attached, said tube intermediate its ends having a chambered member positioned thereabout, the tube having ports providing communication between the chambers and the interior of the tube, a piston positioned therein normally closing the ports, said piston having spaced central ports opening respectively through opposite ends of the piston to the tube, said piston, tube and respective ports being so arranged that on movement of the tracer element and tube in either direction relative to the piston position causes transfer of fluid under pressure to one side of the piston and a discharge of fluid from the other side thereby causing movement of the piston until the uncovered high pressure port is closed, and means connecting the said ported piston with the hydraulic tool operating means whereby movement of the ported piston is duplicated in movement of the tool.

14. In apparatus of the character described in which the tool is caused to move in a plane at an angle to the direction of movement thereof in traversing the work, a tracer element for traversing a pattern as the tool traverses the work, and hydraulically actuated mechanism for positioning the tool to correspond with the position of the tracer element comprising a tube to which the tracer element is attached, a housing in which the tube is slidable, a chambered casing secured to the exterior of the tube intermediate its ends, said casing having chambers at its opposite ends and a central chamber, a centrally ported piston connected with the tool controlling apparatus of a length to just close both the ports for the outer chambers and the central chamber having two ports closed by the piston when in the position of closing the outside ports, movement of the tube in either direction uncovering the port of the respective end chamber providing communication between the interior of the tube on the respective side of the piston and the said end chamber and opening the central chamber through the piston to the opposite side thereof whereby pressure is applied to the said opposite side to move the piston in the same direction as the tube is moved until the ports are again closed whereby movement of the tracer element and tube is duplicated in extent and direction of movement by the piston, and means whereby movement of the piston causes operation of said hydraulically actuated mechanism to correspondingly position the tool.

15. In apparatus of the character described, means for causing movement of a metal working tool in a plane at an angle to the direction of movement in traversing a piece of work, comprising a tracer element caused to traverse the pattern as the tool traverses the work, a hydraulically controlled apparatus actuated through movement of the tracer in a plane at an angle to its direction of movement in traversing the pattern, said means comprising a tube attached to the tracer element, a high and a low pressure conduit, a piston in the tube, means whereby movement of the tube relative to the piston applies high pressure to one side thereof and opens the opposite side to the low pressure conduit whereby movement of the piston is produced duplicate in extent to the movement of the tracer element to thereby actuate the hydraulic apparatus and move the tool through the same distance in a plane at an angle to the direction of movement of the tool in traversing the work, a housing in which the tube is movable, a stationary piston closing the open end of the tube opposite the tracer element, a chamber into which the space between the housing and stationary piston for the tube is open, said low pressure line of the system being open to the said chamber whereby a slight pressure is applied to the tube to hold the tracer in contact with the pattern.

16. In apparatus of the character described, means for causing movement of an element in a manner corresponding to that of the movement of a tracer relative to a pattern, consisting of a hydraulic mechanism including a cylinder and piston therein connected with the element, means for causing a flow of fluid to and from the cylinder in either direction of the cylinder axis, comprising a second cylinder and piston therein, conduits between the said cylinders whereby the movement of the piston in the second cylinder through consequent flow of fluid moves the first named piston, means for moving the said second piston to a predetermined extent consisting of a tracer element for traversing a pattern, a tube connected with the tracer element, a piston in the said tube operatively connected with said second piston, the tube having ports controlled by the position of the piston therein and high and low pressure lines opening to the respective ports in such manner that movement of the tracer element in one direction or the other may apply fluid under pressure to a corresponding side of the piston in the tube and open the opposite side to the low pressure line whereby the piston of the second cylinder is moved by application of fluid under a high pressure to the piston in the tube, the arrangement providing a means for limiting application of power to the piston in the tube during movement of the piston to the exact extent the tube and tracer moves, the cubical content of the first and second cylinders further being in such relation that the first piston and consequently the element controlled is moved a distance determined by the relative capacities of the two said cylinders.

17. In apparatus of the character described, means for causing an element to move correspondingly to the extent of movement of a tracer in a plane at an angle to the surface of a pattern traversed thereby, comprising hydraulically actuatable means for moving the element, means controlled by movement of the tracer in a direction at an angle to the pattern surface to apply pressure to the hydraulically actuatable means consisting of a tube having ports for high and low pressure fluid, a piston movable therein connected with the hydraulically actuatable means, high and low pressure lines opening to the respective tube ports, the said piston in the tube preventing flow from or to the high and low pressure lines when in neutral position relative to the ported section of the tube, movement of the tracer end of the tube relative to the piston permitting flow of fluid from the high to the low pressure line to thereby cause movement of the piston in the same direction as the tube is moved, the extent of movement of the tube and consequently the distance the ported section thereof is moved relative to the piston determining the distance through which the piston is moved by the flow from the high to the low pressure lines to cause cessation of flow.

18. In apparatus of the character described, means for causing movement of a metal working tool in a plane at an angle to the direction of its movement in traversing a piece of work, comprising a tracer element caused to traverse the pattern as the tool traverses the work, a hydraulically controlled apparatus actuated through movement of the tracer in a plane at an angle to its relative direction of movement in traversing the pattern, comprising a tube attached to the tracer element, a stationary head at opposite ends of the tube and positioned therewithin, a high and a low pressure conduit having respective ports opening to the interior of the tube between the heads, a piston in the tube which in neutral position covers certain of the ports in a manner to prevent flow of fluid to or from the tube on either side of the piston whereby movement of the tube relative to the piston applies high pressure to one side thereof and opens the respective opposite side to the low pressure conduit and causing the piston to move to the same extent as the tracer tube is moved, packing rings provided for said heads within the tube, and means whereby fluid under pressure is prevented from accumulating between the tube and the respective stationary heads.

19. In apparatus of the character described, means for causing movement of a metal working tool in a plane at an angle to the direction of its movement in traversing a piece of work, comprising a tracer element caused to traverse the pattern as the tool traverses the work, a hydraulically controlled apparatus actuated through movement of the tracer in a plane at an angle to its relative direction of movement in traversing the pattern, comprising a tube attached to the tracer element, a stationary head at opposite ends of the tube and positioned therewithin, a high and a low pressure conduit having respective ports opening to the interior of the tube between the heads, a piston in the tube which in neutral position covers certain of the ports in a manner to prevent flow of fluid to or from the tube on either side of the piston whereby movement of the tube relative to the piston applies high pressure to one side thereof and opens the respective opposite side to the low pressure conduit and causing the piston to move to the same extent as the tracer tube is moved, said heads having a peripheral channel in the outer face thereof adjacent the respective inner ends, and means connecting the said channels with the low pressure conduit whereby an accumulation of high pressure fluid between the heads and the tube is prevented.

20. In a metal forming machine including a tool for performing a cutting operation, means associated with the machine for moving the tool in a predetermined path to perform the cutting operation, a tracer element movable with the tool and in a predetermined path relative to the pattern, hydraulic means associated with the tool and tracer whereby movement of the tracer in a direction either toward or from the pattern at an angle to its predetermined path of movement by the machine positions the tool relative to the work during the cutting operation, a means of supply of liquid under pressure to the said hydraulic means to rigidly hold the tool from movement either toward or from the work under pressure of the cutting operation and causing movement of the tool in a direction either toward or from the work through movement of the tracer in a direction either toward or from the pattern at an angle to its predetermined path of movement.

21. In a metal forming machine, a cutting tool, power means for causing the tool to perform a cutting operation and means for varying the position of the tool relative to the surface being formed to correspond with the form of a pattern, consisting of a cylinder, a piston therein connected with the tool and through movement of which the tool is positioned relative to the surface being formed, means for supplying the cylinder with fluid under equal pressure upon opposite sides of the piston whereby the piston at any of its possible positions is rigidly supported from movement in either direction, a tracer element for traversing the pattern as the tool traverses the work, and hydraulic control means associated with the tracer whereby movement of the tracer due to the configuration of the pattern varies the position of the said piston in its cylinder and thereby varies the position of the tool relative to the work.

22. In a metal forming machine including a tool and a support therefor moved through a cutting path by movement of its support, means by which the tool is caused to vary its position relative to the surface of the work in its movement in traversing the cutting path and thereby form the work corresponding to the form of a pattern comprising a tool actuating element carried in a path corresponding to the cutting path of the tool and in positively fixed relationship therewith during the cutting movement of the tool, and a fluid pressure actuated control means for said tool actuating element to vary the position of the tool in a direction either toward or from the surface of the work while traversing the path through which it is moved in conjunction with the cutting tool including a tracer riding in contact with the pattern as the tool is caused to traverse the work.

23. In a metal forming machine, a cutting tool, a support therefor relative to which the tool is movable in a single plane and by movement of which support the tool is moved in a cutting path, means for causing movement of the tool relative to its support and thus to vary its position relative to the surface of the work being formed, comprising a tracer element, a support for the tracer element movable in a positively fixed relation with the tool support in its movement causing the tool to traverse a cutting path, and a hydraulic means between the tracer and the tool so arranged that variation of the tracer relative to its support caused by its traverse of the pattern variably positions the tool by hydraulic pressure relative to its support in a direction toward or from the work in its traverse of the work.

24. In a metal forming machine including a tool and a support therefor in which the support is moved to cause the tool to traverse a cutting path relative to the work, means by which the tool is caused to vary its position in its traverse of the cutting path comprising a tracer element, a pattern having a surface shape corresponding to the shape to be formed on the work, a support for the tracer movable in fixed relation with the tool support in its traverse of the cutting path, a hydraulically controlled means holding the tool in a fixed position relative to the surface of the work, and hydraulic means in conjunction with the tracer element actuated by movement of the tracer toward or from the pattern in a direction other than its direction of movement in fixed relation with the tool to control the said hydraulic holding means for the tool to likewise move the tool toward or from the work in a direction other than its direction of movement in the traverse of its cutting path whereby variation in position of the tracer in its traverse of the pattern causes the tool to assume a like position under hydraulic pressure in its traverse of the work.

25. In apparatus for controlling the path of movement of a cutting tool in which the tool is fixed in its traverse of the work in one plane and may be varied in its position in a plane at an angle to its fixed path, a control device for varying the position of the tool during movement through the fixed path comprising a pattern, the form of which is to be reproduced in the work, a pattern engaging element having a constant point contact with the pattern and being fixed in its movement in the same plane as the tool is fixed in its movement, and means controlled by movement of the pattern engaging element in a direction toward or from the pattern caused by traverse of the pattern in the fixed plane of movement with the tool to thereby actuate the tool engaging element to cause variation of the position of the tool in a direction toward or from the work in a plane at an angle to its fixed plane of movement to thereby shape the work to correspond exactly to the pattern.

26. In a metal forming machine including a tool and a support therefor, a support for the work to be operated upon, and means for effecting the relative movement of the supports and thus of the work and tool in a cutting path, means by which the tool is caused to vary its position in the relative traverse of tool and work in said cutting path and thereby form the work corresponding to the form of a pattern, said means comprising a pattern associated with the work, and a tool actuating element associated with the tool whereby the tool actuating element and pattern are relatively moved in a path corresponding to the said cutting path of the tool and in positively fixed relation therewith during the cutting operation of the tool, and a fluid pressure actuated control means for said tool actuating element to vary its position during traverse of its said path in a direction toward or from the work including a tracer riding in contact with the pattern and movable thereby in a direction toward or from the same depending upon the surface configuration of the pattern during relative movement of the tool and work in the cutting path.

27. In a metal forming machine, a work support, a cutting tool, a support therefor relative to which the tool is movable in a single plane either toward or from the work, means for effecting movement of one of said supports by movement of which support the tool and work are moved one with respect to the other in a cutting path, means for causing movement of the tool relative to its support and thus to vary its position in said single plane of movement relative to the surface of the work being formed, comprising a tracer element, a support for the tracer element movable in a fixed relation with the tool support in its movement causing the tool to traverse a cutting path, a pattern traversed by the tracer element through movement of its support, and a hydraulic means between the tracer and the tool so arranged that variation of the tracer relative to its support caused by its traverse of the pattern locates the tool by hydraulic pressure in any of its possible positions relative to its support in the relative movement of the tool and work in the first mentioned cutting path.

28. In a metal forming machine including a work support, a tool, and a support therefor, in which one of the supports is moved to cause relative traverse of the work and tool in a cutting path, means by which the tool is caused to vary its position in a direction either toward or from the work in traverse of said cutting path, comprising a tracer element, a pattern having a surface shape corresponding to the shape to be formed on the work, a support for the tracer in fixed relation with the tool support and movable therewith, the traced being movable relative to its support in a direction either toward or from the pattern in its traverse thereof, a hydraulically controlled means holding the tool in a fixed position relative to the surface of the work, and hydraulic means in conjunction with the tracer element actuated by movement of the tracer with respect to its support to control the said hydraulic holding means for the tool to likewise move the tool in a direction transversely of the first mentioned cutting path whereby variation of the position of the tracer in a plane transversely of its path in the relative traverse of pattern and tracer causes the tool to assume a like position in respect to the work under hydraulic pressure in the relative traverse of tool and work.

29. In an apparatus for controlling the path of resultant movement of a cutting tool and work in which there is a fixed path of relative movement of the tool and work in one plane and the position of the tool may be varied in a plane at an angle to the plane of movement in said fixed path in a direction toward or from the work, a control device for varying the position of the tool in said second plane of movement during relative movement in the plane of said fixed path comprising a pattern, the form of which is to be reproduced in the work, a controlling device positively fixed in its movement in the same plane as the tool is fixed in its movement, including a pattern engaging element movable in its plane at an angle to the fixed plane of movement of the controlling device, and means controlled by movement of the pattern engaging element in said last named plane caused by relative traverse of the element and pattern in the fixed plane of relative movement of the tool and work to thereby actuate the tool engaging element to cause variation of the position of the tool in its plane of movement at an angle to said fixed plane of movement to thereby shape the work to correspond exactly to the pattern.

30. In a metal forming machine including a tool and work support arranged to cause a relative traverse of the work and the tool hydraulically controlled mechanism for moving the tool in a direction other than the direction of relative traversing movement of the tool and the work, comprising a cylinder and a piston therein, a rod rigidly connected with the piston and the tool whereby the position of the piston in the cylinder determines the position of the tool, a pattern, a tracer element arranged to traverse the pattern as the tool traverses the work, means movable to cause a flow of fluid simultaneously to one side of the said piston and from the other side to cause movement thereof, a power means for moving said movable means, and means whereby movement of the tracer element in a direction other than the direction of movement thereof in traversing the pattern applies the power to cause movement of the piston and consequently of the tool to the exact or proportional extent corresponding to the extent the tracer element is caused to move in traversing the pattern.

31. In apparatus of the character described, the combination with a metal cutting tool and a pattern the form of which is to be reproduced in the work being shaped by the tool and mechanism for causing relative movement of the tool and work in the cutting operation, of mechanism for causing the tool to take a varied path in the cutting movement comprising a mounting relative to which the tool is movable in a direction other than the first mentioned direction of relative movement of the tool and work in the cutting operation, a tracer element for contacting the pattern, a fluid pressure controlled mechanism by which the tool is rigidly supported at any point in its mounting, means actuated by the tracer element to cause application of pressure to the fluid pressure controlled mechanism to move the tool relative to its mounting in a direction either toward or from the work including a valve structure permitting application of pressure and consequent movement of the tool to a distance exactly corresponding to movement of the tracer element.

32. In mechanism for controlling the path of movement of a metal cutting tool in a metal working machine having a means for causing a relative movement of the tool and the work, means for predetermining the path of movement of the tool, comprising a pattern or model, a tracer element, the tracer element and pattern being movable one relative to the other as the tool and the work are relatively moved, a hydraulically controlled apparatus for positioning the tool relative to the surface of the work being formed, means for producing a flow of fluid under pressure, and means operable through movement of the tracer element in a direction either toward or from the pattern to apply the fluid under pressure in a manner to actuate the hydraulic means of the tool to move the tool to a like extent in a direction either toward or from the work.

33. In a machine for producing on a work piece a contour or profile corresponding to that of a pattern or master, the combination with a tracer and a master, of means mounting said parts for relative movement in angularly related directions whereby any component directional movement may be effected, a cutter mounted in positively fixed relation to one of said two first mentioned parts, and a work support correspondingly mounted in respect to the other of said parts whereby said cutter and work support are adapted to be operatively shifted one toward or from the other for production of a surface on a work piece held by the support corresponding to the master, hydraulic actuating means for effecting relative movement of the work and cutter in either of said last named directions, a control valve mechanism for regulating the operative effect of said hydraulic actuating means, the tracer having a portion automatically maintained in engagement with the master to determine the action of the control valve mechanism and thus the hydraulically effected relative movement of the work and cutter.

34. In a metal forming machine including a tool actuated by the machine in performing a cutting operation on a piece of work, means for causing the tool to traverse the work in a cutting path, and means for varying the position of the tool in a direction either toward or from the work during its traverse of said path comprising, a tool actuating element, a control means therefor including a tracer supported in positively fixed relation with the tool and thereby caused to traverse the pattern as the tool is caused to traverse the work, the said tracer being capable of movement in a direction toward or from the pattern at an angle to its said path of traverse of the pattern, a hydraulically actuated mechanism for operating the tool actuating element, and means whereby movement of the tracer in a direction toward or from the pattern at an angle to its path of traverse of the pattern actuates the hydraulic mechanism to move the tool to a like extent in a direction toward or from the work at an angle to its path of movement in traverse of the work.

35. In a metal forming machine, a tool and a tracer mounted in fixed relation, a work support carrying a piece of work to be traversed by the tool and a pattern to be traversed by the tracer, means for causing movement of the tool and tracer relative respectively to the work and pattern in straight lines, both the said tool and said tracer being movable relative to the respective supporting means therefor in a direction either toward or from the respective work or pattern at an angle to the relative direction of movement in the said straight line traverse of the work and pattern, and hydraulic mechanism actuated by movement of the tracer in a direction either toward or from the pattern at an angle to its straight line movement to correspondingly move the tool in a direction either toward or from the work at an angle to its straight line movement whereby the surface of the work cut by the tool in the said straight line corresponds to the surface form of the pattern across which the said tracer is moved in a straight line.

36. In a metal forming machine, a tool, a support therefor relative to which the tool is movable, a hydraulic cylinder and a piston therein connected with the tool, a tracer carried by the tool support in fixed relation with the tool, and relative to which the tracer is movable, a second hydraulic cylinder and a piston therein associated with the tracer, means between the tracer and the last named piston whereby movement of the tracer relative to its support causes movement of the said last named piston to the same extent, a work and pattern support on which the work and the pattern are positioned for engagement respectively with the tool and tracer, and means for causing a relative movement of the pattern and work support and the tool and tracer support, said cylinder associated with the tool being in a closed hydraulic circuit with the cylinder associated with the tracer, the said hydraulic circuit being completely filled with liquid whereby movement of the piston associated with the tracer by movement of the tracer relative to its said support causes movement of the piston associated with the tool to thereby move the tool to like extent relative to its said support, said closed hydraulic circuit supporting the pistons associated respectively with the tracer and tool under equal pressure upon opposite sides whereby the tool is rigidly supported in any of its possible positions relative to the work, the arrangement being such that the traverse of the pattern by the tracer, due to the configuration of the surface of the pattern in the path traversed thereby, causes movement of the tracer relative to its support in a direction other than its direction of traverse of the pattern and thereby causes the tool to likewise move relative to its support in a direction other than its direction of traverse of the work and thus to form the work in the said path of traverse of the tool to correspond to the form of the tool to correspond to the form of the pattern in the path traversed by the tracer.

37. In a metal forming machine, a tool, a tracer, a support for a piece of work and a pattern, means for causing a relative traverse of the tool and work and of the tracer and pattern in a straight path in a single plane across the respective surfaces thereof, the tool and the tracer being supported for movement at an angle to the surface of the work and of the pattern to be respectively traversed thereby, and a hydraulic mechanism between the tool and the tracer actuated through movement of the tracer in a direction at an angle to its path of traverse of the pattern to cause movement of the tool in the same direction and to the same extent relative to its path of traverse of the work.

38. In a metal forming machine, a tool, a tracer, a support for a piece of work and a pattern, means for causing a relative traverse of the tool and work and of the tracer and pattern in a straight path simultaneously across the respective surfaces thereof, the tool and the tracer being supported for movement at an angle to the surface of the work and of the pattern to be respectively traversed thereby, and a hydraulic mechanism between the tool and the tracer actuated through movement of the tracer in a direction at an angle to its path of traverse of the pattern to cause movement of the tool in the opposite direction and to the same extent relative to its path of traverse of the work.

39. In a metal forming machine, a tool and a tracer supported in fixed relation, a support on which a piece of work and a pattern are mounted in fixed relation, means for causing a relative traverse of the work by the tool and of the pattern by the tracer in a straight path across the respective surfaces thereof, the tool and the tracer being supported for movement at substantially a right angle to the surface of the work and of the pattern to be respectively traversed thereby, and a hydraulic mechanism between the tool and the tracer actuated through movement of the tracer at a right angle to its path of traverse of the pattern to cause movement of the tool at a right angle to its path of traverse of the work to a like extent.

40. In a metal forming machine, a tool, a tracer, a support for a piece of work and a pattern, said machine including a means for causing a relative traverse of the tool and work and of the tracer and the pattern simultaneously in successive parallel straight lines whereby through successive operations of the machine the surface of the work and of the pattern has been traversed throughout the surface respectively presented to the tool and tracer, the said tool and tracer being supported for movement at an angle to the surface of the work and of the pattern to be respectively traversed thereby, and a hydraulic mechanism between the tool and tracer actuated through movement of the tracer in a direction at an angle to its successive paths of traverse of the pattern to thereby cause movement of the tool to a like extent in its successive paths of traverse of the work.

41. In a metal forming machine including a tool and a support therefor movable by the machine to cause the tool to traverse a piece of work in successive parallel paths in a single plane, means by which the tool is caused to form the surface of the work corresponding to the form of the surface of the pattern comprising a tool actuating element, a fluid pressure actuated control means therefor, a tracer arranged to traverse the surface of the pattern in successive parallel paths and in the same plane as the tool is caused to traverse the work, and means whereby movement of the tracer in a direction at an angle to the surface of the pattern traversed actuates said fluid pressure control means to cause movement of the tool at an angle to the surface of the work traversed thereby to a like extent whereby the surface of the work is shaped to correspond to the surface of the pattern.

42. In a metal forming machine including a tool and a support therefor movable by the machine to cause the tool to traverse a piece of work in successive parallel paths in a single plane, means by which the tool is caused to form the surface of the work corresponding to the form of the surface of a pattern, a tracer movable by the machine in mechanically fixed relation with the tool to traverse the surface of the pattern in successive parallel paths in the same plane as the tool is caused to traverse the work, and a hydraulically controlled means actuated by the tracer through movement thereof at an angle to the said single plane of movement to cause movement of the tool at the same angle to said single plane of movement and to a like extent whereby the surface of the work is shaped to correspond to the surface of the pattern.

43. In a metal forming machine, in combination, a work support for a piece of work, a pattern adapted to be mounted on said support in fixed relation to said work, a tool support, a cutting tool and a tracer mounted on said tool support respectively in position to engage the work and said pattern, means for moving said supports relatively to each other in one direction to jointly index said tool and said tracer step-by-step respectively across the work and said pattern, means for causing relative reciprocation between said supports respectively after successive indexing movements in a direction perpendicular to said one direction, whereby to define a series of parallel straight-line cutting paths in a common plane between said tool and the work, said tool being mounted on said tool support for adjustment in a direction perpendicular to said plane, and a hydraulic transmission mechanism controlled by said tracer and operable automatically to effect said adjustment of said tool into and out of the work in the course of said relative reciprocation to modify each cutting path as determined by the simultaneous movement of said tracer relatively along a corresponding element of said pattern, said hydraulic transmission mechanism including a source of fluid under pressure, a hydraulic motor for effecting adjustment of said tool, and a valve operable reversibly out of intermediate neutral position in which said source is disconnected from said motor to connect said source reversibly to said motor, and including two coacting valve elements of which one element is movable by said tracer and the other element is movable synchronously with said tool in a follow-up direction tending to establish said valve in neutral position.

44. In a metal forming machine, in combination, a work support for a piece of work, a pattern adapted to be mounted on said support in fixed relation to said work, a tool support, a cutting tool and a tracer mounted on said tool support respectively in position to engage the work and said pattern, means for moving said supports relatively to each other in one direction to jointly index said tool and said tracer step-by-step respectively across the work and said pattern, means for causing relative reciprocation between said supports respectively after successive indexing movements in a direction perpendicular to said one direction, whereby to define a series of parallel straight-line cutting paths in a common plane between said tool and the work, said tool being mounted on said tool support for adjustment in a direction perpendicular to said plane, and a hydraulic transmission mechanism controlled by said tracer and operable automatically to effect said adjustment of said tool into and out of the work in the course of said relative reciprocation to modify each cutting path as determined by the simultaneous movement of said tracer relatively along a corresponding element of said pattern.

45. In a metal forming machine, in combination, a work support for a piece of work, a pattern adapted to be mounted on said support, a tool support, a rotary cutting tool and a tracer mounted on said tool support in laterally fixed relation for coacting engagement respectively with the work and said pattern, said tool extending axially toward the work and having an end cutting face, means operable independently of said tracer for effecting relative rectilinear movement at a uniform rate between said supports to traverse said tool across the work in a predetermined component cutting stroke and simultaneously to traverse said tracer across said pattern, and hydraulic transmission means for causing a component movement of said tool axially in a direction perpendicular to said rectilinear movement into and out of the work, said transmission means being automatically operable under the control of said tracer in the course of said rectilinear movement to modify the resultant cutting path of said tool in accordance with the form of said pattern.

46. In a metal forming machine, in combination, a work support for a piece of work, a pattern adapted to be mounted on said support, a tool support, a cutting tool and a tracer mounted on said tool support in laterally fixed relation for coacting engagement respectively with the work and said pattern, said tool extending generally longitudinally toward the work, means operable independently of said tracer for effecting relative rectilinear movement between said supports to traverse said tool across the work in a component cutting stroke and simultaneously to traverse said tracer across said pattern, and hydraulic transmission means for causing a component movement of said tool generally lengthwise in a direction perpendicular to said reciprocation into and out of the work, said transmission means being automatically operable in the course of said rectilinear movement and under the control of said tracer to obtain a resultant cutting path of said tool modified in accordance with the form of said pattern.

47. In a metal forming machine, in combination, a rotary work support for a piece of work, a pattern adapted to be mounted on said support for rotation with said work, a tool support, a cutting tool and a tracer mounted on said tool support in laterally fixed relation for coacting engagement respectively with the work and said pattern, said work being rotatable and being movable axially relatively to said tool in a predetermined cutting path while said pattern is similarly movable in relation to said tracer, and hydraulic transmission means for causing toward and from movement of said tool axially of said work, said means being automatically operable under the control of said tracer to modify said cutting path of said tool in accordance with the form of said pattern.

48. In a metal forming machine, in combination, a work support mounted for horizontal reciprocation in a predetermined rectilinear direction, and on which a work piece is adapted to be positioned, a pattern adapted to be mounted on said support in fixed relation to the work piece, means for reciprocating said support, a slide mounted for horizontal translation in a direction perpendicular to said first mentioned direction, means for automatically translating said slide in a step-by-step indexing movement in timed relation to the reversals of said work support, a tracer mounted on said slide for vertical movement in a direction perpendicular to the plane of said two first mentioned directions, a tool support mounted on said slide for movement in the same direction as said tracer, a cutting tool mounted on said tool support for movement therewith, said tracer and said tool being positioned respectively to traverse said pattern and the work piece in the relative reciprocations of said work support, and a hydraulic control means operatively connecting said tracer and said tool support and effective to adjust said tool vertically into and out of the work piece in the course of each straight line traverse of said work support to modify the cutting path in accordance with the shape of the corresponding element of said pattern followed by said tracer, whereby, in the course of repeated reciprocations of said work support respectively after successive indexing movements of said slide, said tool is caused to take a series of laterally-spaced cuts across the work modified in vertical configuration from coplanar parallel straight-line paths in accordance with correspondingly-spaced tracer-contacted elements of said pattern.

CLEMENT C. RICHARD.